United States Patent

[11] 3,559,728

[72] Inventors Roger T. Lyman
Princeton;
William G. Stewart, Pennington, N.J.
[21] Appl. No. 779,886
[22] Filed Nov. 29, 1968
[45] Patented Feb. 2, 1971
[73] Assignee Kooltronic Fan Company
Princeton, N.J.
a company of New Jersey

[54] ELECTRONIC EQUIPMENT RACK TEMPERATURE CONTROL
11 Claims, 7 Drawing Figs.

[52] U.S. Cl. 165/55, 165/122, 165/166
[51] Int. Cl. F24h 9/04
[50] Field of Search 165/55, 57, 50, 122, 77, 86, 166

[56] References Cited
UNITED STATES PATENTS

| | | | |
|---|---|---|---|
| 2,226,061 | 12/1940 | Kershaw | 165/57 |
| 2,478,617 | 8/1949 | Anderegg | 165/57 |
| 2,717,766 | 9/1955 | Becker | 165/77 |

*Primary Examiner*—Charles Sukalo
*Attorney*—Ostrolenk, Faber, Gerb and Soffen

ABSTRACT: A self-contained cooling or heat exchange unit whose depth is quite small to permit external mounting of the unit to the wall of an enclosure for cabinets and the like as a door for the enclosure or as a separator positioned within a narrow clearance between cabinets.

INVENTORS
WILLIAM G. STEWART
ROGER T. LYMAN
BY
Ostrolenk, Faber, Gerb & Soffen
ATTORNEYS INVENTORS
WILLIAM G. STEWART
ROGER T. LYMAN
BY
Ostrolenk, Faber, Gerb & Soffen
ATTORNEYS

ELECTRONIC EQUIPMENT RACK TEMPERATURE CONTROL

BACKGROUND OF THE INVENTION

The present invention relates to temperature control units and is more particularly concerned with the provision of a self-contained temperature control unit panel.

There exist many applications in which cooling units or temperature control units must be provided to control the temperature within a cabinet. The preferred mounting to strive for is one in which the unit is neither situated within the cabinet space nor projecting into the cabinet space. One application where these requirements are particularly true is in the provision of a temperature control unit for electronic equipment racks or enclosures since the space within such racks or enclosures is needed for the electronic equipment and such equipment cannot, as a practical matter, be moved around at random or arranged in an awkward manner within such enclosures to provide sufficient space for temperature control equipment. For instance, in many situations movement of the electronic equipment may effect the operating characteristics of the circuits or it may complicate equipment inspection and/or maintenance procedures.

In the above example several additional problems arise in the provision of temperature control units. For example, undesirable effects may be created by the characteristics of the temperature control unit, that is, by the physical characteristics of the unit and by the electrical fields created by the electrical components in the temperature control unit such as motors or control components.

Additional problems exist where the electronic equipment is situated in environments of limited space requiring high packaging density of equipment. In such situations it is necessary that the temperature control unit take up a minimum of space. Furthermore, it is frequently necessary that the electronic equipment be accessible from the front and rear so that the temperature control unit must be conveniently movable.

A further problem which must be considered in the provision of a temperature control for an electronic equipment enclosure is that in most situations it is necessary for the electronic equipment to be kept clean and free of any external influences. As a result it is often necessary to prevent the flow of ambient air into the interior of the electronic equipment enclosure.

Until the present invention, existing temperature control units have not been successful in solving the above problems. For instance, prior temperature control units have required that they by physically situated within the enclosure to be cooled or at least projecting partially into the enclosure or occupying the top or bottom portions of the enclosure in order to effectively cool and circulate the air within the enclosure. Or else, the prior temperature control units have been physically shaped so as to interface with the electrical operation of or access to the electronic equipment or the components of the temperature control apparatus were located in more than one location (i.e., at the top and bottom of the enclosure) so as to complicate design of both the electrical equipment being cooled and the cooling unit.

The instant invention solves all of the above problems of the prior art by providing in one embodiment thereof a self-contained temperature control unit having at least one substantially flat surface for sealing the opening of the enclosure and having a hinge means so as to permit the temperature control unit to be conveniently operated as a door to gain access to the electronic equipment. The temperature control unit may include fans and/or blowers in combination with heat exchangers, self-contained air conditioners, etcetera. The fans and/or blowers assist the convective flow of air and maintain proper circulation of air in the enclosure to provide temperature control throughout the entire enclosure and to remove heat generated in the temperature control unit itself. The substantially flat surface sealing the enclosure opening may be metallic to provide shielding of the electronic equipment inside the enclosure from interference due to the electrical equipment in the temperature control unit and external electrical or magnetic interference and is normally provided with openings at the top and bottom to permit the air in the enclosure to circulate through the temperature control unit for temperature control.

The temperature control unit of the instant invention is self-contained to form a single compact unit easily installable on existing electronic equipment enclosures. In addition, by having the unit self-contained within the equipment door the interior space within the enclosure and the equipment arrangement is more orderly.

It is, therefore, one object of the instant invention to provide a temperature control unit which is completely self-contained.

It is another object of the instant invention to provide a temperature control unit which may be attached to the walls of an enclosure to form a door to the enclosure without projecting into the enclosure permitting optimum utilization of the enclosure interior space.

It is another object of the present invention to provide a temperature control unit suitable for use with an electronic equipment enclosure or rack without disturbing the operation of the electronic equipment.

Another object of the instant invention is to provide a temperature control unit which will cool the electronic equipment in an enclosure by recirculating and cooling the air in the enclosure and by preventing ambient air from entering the enclosure and thereby keep the electronic equipment clean and free from dust in the air.

It is another object of the present invention to provide a cooling unit which may be mounted on an existing door on a cabinet or which may replace the door entirely.

A further object of the instant invention is to provide, in a second embodiment thereof, a cooling unit for electronic equipment racks which may be placed between a pair of racks and attached thereto to control the temperature of the equipment in both adjacent racks.

The above objects and features of the instant invention along with other objects and features will become apparent from a reading of the description of the invention in conjunction with the drawings, as follows.

Figures 1, 2, 2A:
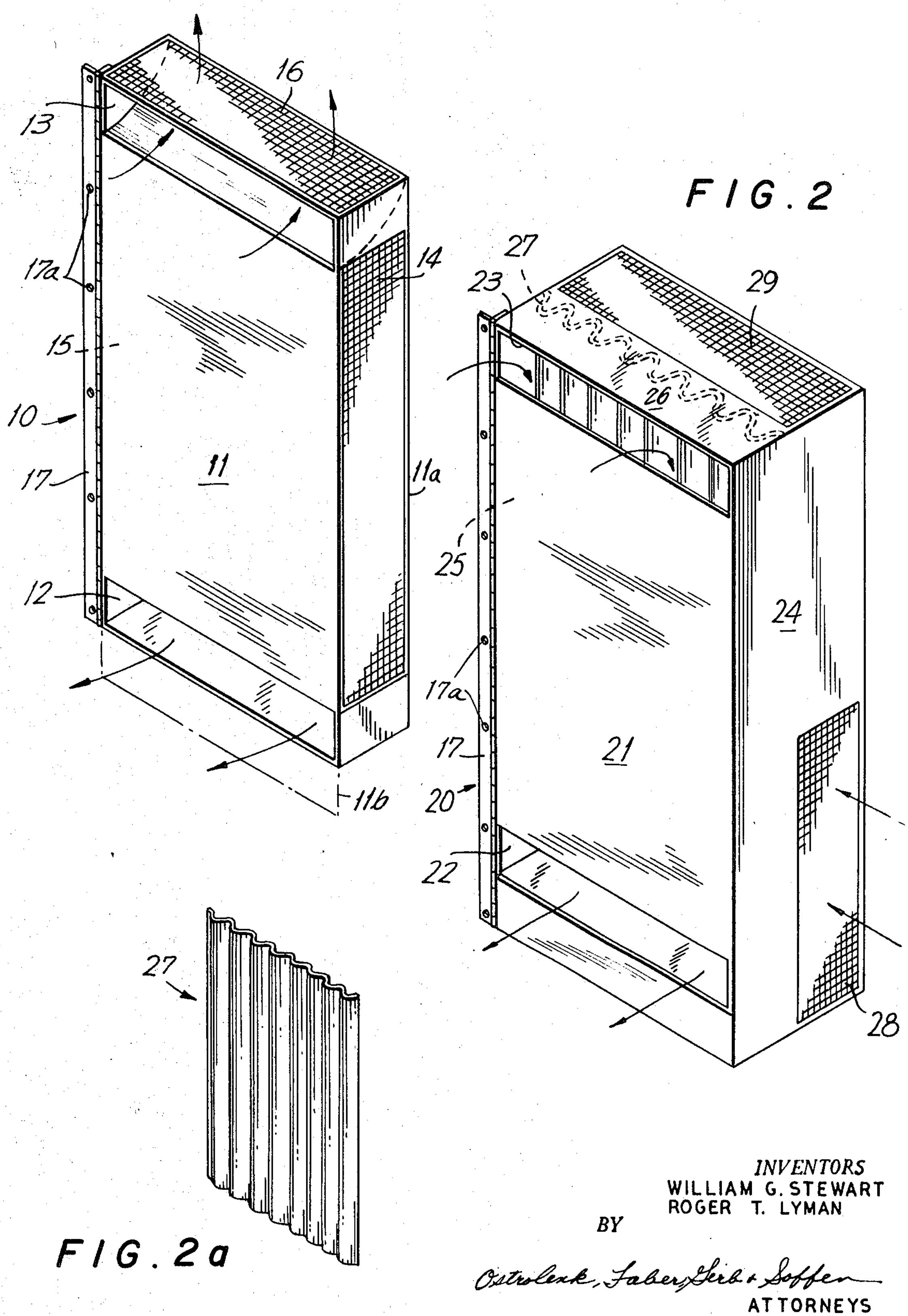
FIG. 1 is a perspective view of one embodiment of the temperature control unit of the instant invention.
FIG. 2 is a perspective view of a second embodiment of the temperature control unit of the instant invention.
Figure 3:
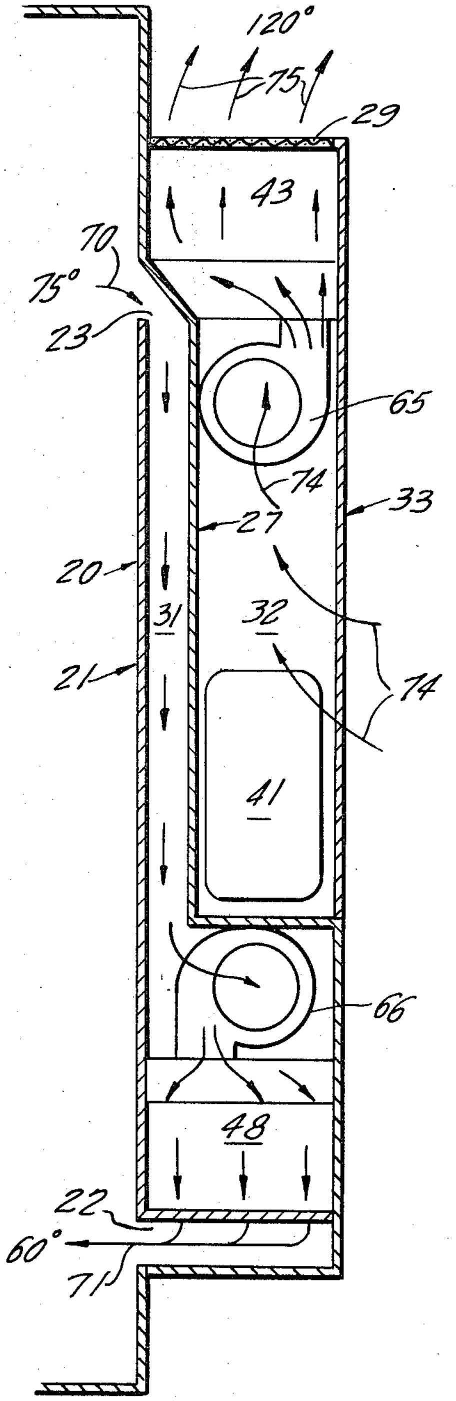
Figures 4, 5:
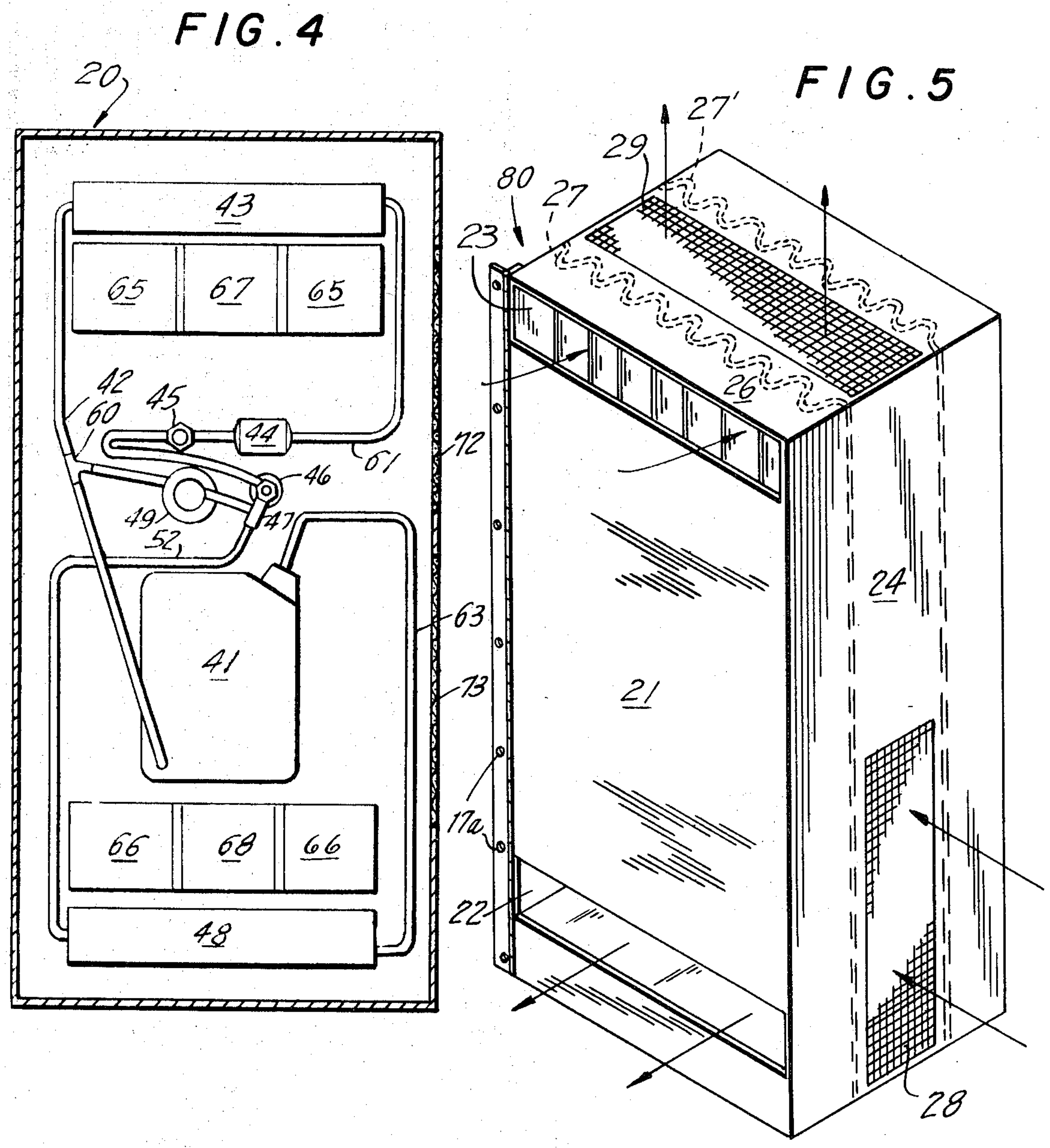

FIG. *2a* is a perspective view of the barrier within the temperature control unit of FIG. 2 which constitutes the heat transfer surface;

FIG. *2b* is an end view showing the internal arrangement of the embodiment of FIG. 2;

FIG. 3 is a cross-sectional side view of the embodiment of the temperature control unit in FIG. 1 including refrigeration equipment within the unit;

FIG. 4 is a schematic diagram of typical refrigerating equipment, which typical equipment may be employed in the instant invention;

FIG. 5 is a perspective view of a third embodiment of the temperature control unit of the instant invention.

Referring first to the embodiment of the instant invention shown in FIG. 1, the temperature control unit 10 shown therein is generally rectangular in shape and has a hollow interior containing a fan or blower (not shown).

The temperature control unit 10 of FIG. 1 has a substantially flat surface 11 with a pair of openings 12 and 13 facing the interior of the enclosure (not shown) upon which it is mounted. The side of the unit 10 comprised of the surface 11 and the openings 12 and 13 is so dimensioned as to fit over and seal the opening of an enclosure which is to be temperature regulated. The surface 11 may be made of metallic conductive material and may be electrically grounded to provide an electrical shield for the enclosure. The openings 12 and 13 may be fitted with conductive screens or panels (not shown) for further electrical shielding.

The unit 10 is also furnished with sides 14 and 15, a rear side opposite side 11*a* and a top 16 and a bottom. The side 14 and top 16 have openings in the crosshatched areas with the crosshatched areas representing screens and/or air filters provided especially to filter air entering the enclosure.

The unit 10 additionally includes a mounting hinge 17 (sometimes referred to as a piano hinge) having a plurality of apertures 17*a* for mounting the entire unit to a cabinet whereby the unit 10 may be moved to the closed position so that the surface 11 and openings 12 and 13 cover the openings of the cabinet. While a hinge 17 has been shown, it is to be understood that the unit 10 may be conveniently secured to an existing door of a cabinet by suitable securing means and portions in the door may be cut out to provide openings coinciding with openings on a unit such as 10. It is further to be understood that where the opening of a cabinet is larger in area than the area covered by surface 11 and openings 12 and 13 the unit 10 may be provided with easily attachable filler panels at either the top or bottom ends (see panel 11*b*, for example) to cover the cabinet opening completely so that ambient air cannot directly enter the cabinet through its openings without passing through the air filter in side 14.

In operation, a blower in the unit 10 draws air into the unit through the inlet air filter and screen of side 14 into the cabinet enclosure (not shown) through the blower air outlet opening 12 in surface 11. This flow of air provides a forced convection in the enclosure to remove heat generated by electrical equipment (not shown) mounted in the enclosure. The warm air from the enclosure then rises due to both convection and blower action and exits through opening 13 in surface 11 and the opening in top 16 of unit 10. In the above manner the heat from electrical equipment is removed and the temperature within the enclosure is controlled and cooled by the forced convection process. Filtration of coming air keeps the electrical equipment free of dust and dirt.

In the embodiment shown in FIGS. 2—4 there is shown therein a temperature control unit 20. The unit 20 is similar to the unit 10 of FIG. 1 in that both the rectangularly shaped having a substantially flat surface with openings therein for completely covering the opening of a cabinet or enclosure so as to provide a forced convection of the air within the enclosure. More specifically, the unit 20 includes a substantially flat surface 21 having openings 22 and 23 into the interior of unit 20.

The outside walls of unit 20, in addition to the side defined by surface 21 and openings 22 and 23, include sides 24 and 25, a front side opposite side 21 and top 26 and a bottom. In addition to the outside walls, an interior partition is provided in the form of a heat transfer surface 27 which may be a thin aluminum sheet seen more clearly in FIG. 2*a*. The heat transfer surface 27 preferably has a serpentine, corrugated or extended surface cross-sectional configuration so as to provide a large and more efficient heat transfer surface. The heat transfer surface 27 separates the unit 20 into two separate chambers 31 and 32 (see FIG. 3) which chambers are defined by surfaces 21 and 27 and by surface 27 and front wall 33, respectively. The latter chamber additionally has openings 28 and 29 in the sidewall 24, and the top 26, respectively. It should be noted that opening 28 may be placed near the bottom of the front or other sidewall if desired. Likewise, opening 29 may be placed near the top of the front or sidewalls, if desired. An additional benefit of providing the external air inlet ports along the sidewalls of the electronic cabinet air conditioner is that the front surface of the air conditioner may be placed flush against room walls or other vertical surfaces if desired, or in the narrow space between two adjacent cabinets housing electronic equipment.

Figure 2B:
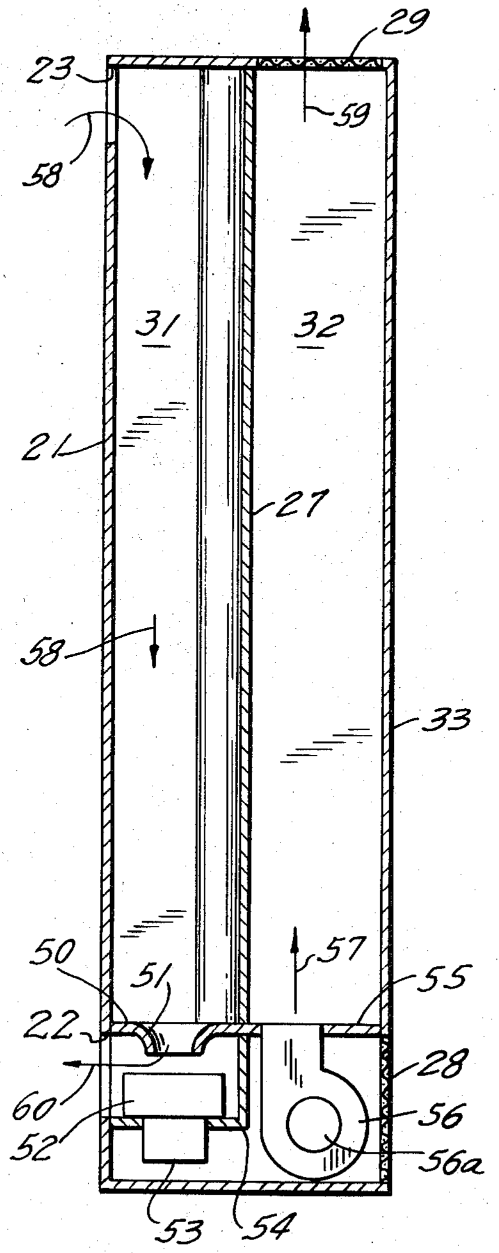

As can be seen in FIG. 2*b*, the chamber 31 has openings communicating with the cabinet interior when the door unit 20 is closed. The door unit is mounted by means of the apertures 17*a* provide in the mounting rail 17 of the door hinge. The chamber 32, on the other hand, has openings 28 and 29 which communicate with the air external to the enclosure. The purpose of the two chambers will be explained hereinafter.

FIG. 2*b* shows the internal arrangement of the unit 20. Considering the chamber defined by surfaces 21 and 27, it can be seen that the bottom of this chamber is provided with a plate 50 having curved portions 51 with the opposing edges defining an opening in which is positioned a blower 52 for directing the air downwardly through the chamber so as to exit through opening 22. Blower 52 is powered by a blower motor 53 which is positioned outside of barrier walls 54 so that the motor 53 is removed from the path of internal airflow and further so that any heat or magnetic or electrical disturbance generated by blower motor 53 is prevented from entering into either the left-hand chamber or the interior space of the cabinet. The right-hand chamber 32 defined by surfaces 27 and 33 is provided with a barrier wall 55 having a suitable opening for the outlet of external air blower powered by a blower motor (not shown). The air inlet 28 communicates with the air inlet 56*a* of the external air blower so that the air is drawn into air blower 56 and directed upwardly as shown by arrow 57. Obviously, the barrier plate 55 is provided with a suitable opening for permitting the ingress of air into the external air chamber. It can clearly be seen that the barrier walls 54 place the internal air blower motor 53 in the same chamber with external blower 56.

In operation, the air confined within the internal region of the cabinet (not shown) enters into opening 23 at the upper end of the door unit 20. The air is drawn inwardly and downwardly, as shown by arrow 58 under the control of internal air blower 53 which then returns the air through opening 22 into the cabinet interior face as shown by arrow 60. The external chamber draws air inwardly through opening 28 and the inlet 56*a* of blower 56 causing the air to be directed vertically upward as shown by arrow 57. The air passes through the external chamber 32 and leaves through the upper opening 29, as shown by arrow 59. As can clearly be seen, the air flowing through the internal chamber, as shown by arrows on 58 and 60, makes surface contact with the heat transfer surface 27 causing the heat to be transferred to this surface. The air passing vertically upward through the external chamber, which is cooler than the heat transfer surface, withdraws the heat from the heat transfer surface and carries the heated air out through opening 29. Heat transfer surface 27 further operates as a barrier to completely separate the external and internal chambers so there is no passage of air therebetween. Thus, all of the air within the cabinet enclosure is retained therein. The heat transfer surface which is corrugated or otherwise formed to have a rather large surface area, acts to carry away a substantial amount of heat generated within the cabinet interior so as to substantially reduce the temperature level within the cabinet. Experimentation has shown that the arrangement of FIGS. 2 and 2*a* is capable of reducing the temperature level within the cabinet by more than 30° below the temperature level which would be encountered without the use of cooling unit.

Referring now to FIGS. 3 and 4, there is shown typical refrigeration equipment which may, for example, be employed in the embodiment of the temperature control unit 20 shown in FIG. 2 to further reduce the temperature in the cabinet. The unit shown in FIGS. 3 and 4 comprises a compressor which operates continuously and is not thermostatically controlled. As will be more fully described, an adjustment of the hot gas bypass valve permits the passage of more or less hot gas through the air conditioner, raising or lowering the air outlet temperature until the system balances. As shown in FIG. 4, the air conditioning unit is comprised of a compressor 41 coupled through a conduit 42 to a condenser 43. The conduit 42 is further coupled through a suitable coupler 60 to a hot gas bypass valve 49. The condenser 43 is further coupled through a conduit 61 to a filter mechanism 44, a sight glass assembly 45, an expansion valve 46 and a distributor 47 to evaporator 48 through conduit 62. Compressor 41 is further coupled to evaporator 48 through a conduit 63. Upper and lower blower fans 65 and 66 powered by blower motors 67 and 68, respectively, act to control the flow of cool air out of and into the chamber respectively at the upper and lower ends thereof by blowing air through the evaporator 48 to cool the air before entering into the cabinet and by drawing the warmer air in the conduit through the radiating fins of the condenser where the air is suitably cooled.

As was previously mentioned, adjustment of the hot gas bypass valve controls the temperature of the cabinet being cooled. The bypass valve, in being moved to a more open position, allows more hot gas to pass through the evaporator, thereby raising the air outlet temperature. By reducing the opening of the hot gas bypass valve, less hot gas passes through the evaporator, causing the cabinet temperature to be lowered. A constant compressor operation eliminates high current starting transients, reduces compressor motor temperature rise and extends system life. The use of the hot gas bypass valve eliminates the need for an electrical temperature control system while providing extremely close temperature regulation over a broad range of power dissipation and temperature variation. FIG. 3 shows a side view in the embodiment of FIG. 4, which is very helpful in describing the operation of the present invention.

The barrier wall 27 separates the air conditioning unit from the electronic cabinet or enclosure so that no air passes between the cabinet and the region external to the cabinet. The warm air in the cabinet enters, as shown by arrow 70, and is urged downwardly by blower 66 which causes the heated air to pass through evaporator 48 where it is sufficiently cooled and caused to reenter an electronic enclosure through opening 22, as shown by arrow 71. The air conditioning unit communicates with suitable openings provided in the vertical sidewalls such as, for example, openings 72 and 73, shown in FIG. 4. The air is caused to move through condenser 43 as shown by arrows 74, which urges the air through the condenser unit 43 and out through the top opening 29 as shown by arrows 75.

It should be understood that the unit 20 of FIGS. 3 and 4 may be provided with a hinge 17 such as shown in FIG. 1 or it may be attached to a cabinet in any manner described with respect to the embodiment of FIG. 1.

Referring next to the embodiment shown in FIG. 5, there is disclosed a temperature control unit 80. The unit 80 is very similar to unit 20 of FIG. 2 with the exception that the unit 80 includes three chambers instead of the two chambers of unit 20. In particular, unit 80 includes two outside chambers similar to chamber 31 of unit 20 and it includes a central chamber similar to chamber 32 of unit 20. Since unit 50 is so similar to unit 20 the corresponding parts have been correspondingly numbered. In addition, it should be understood that the outside chambers may be identical.

In use, the unit 80 is placed between a pair of cabinets with the outside surfaces 21 in engagement with the openings of the cabinets. In this manner two cabinets may be cooled by a single temperature control unit 80 which occupies a minimum of space. If a refrigeration unit is not used the barriers 27 and 27′ may be the heat transfer surfaces of the type shown in FIG. 2*a*.

As has been explained earlier, the temperature control units of the instant invention not only occupy a minimum of space, but they eliminate interference with the operation of electronic equipment inside the cabinets first by not projecting into the cabinets and second by shielding the electronic equipment from external interference and from electrical fields created by the refrigerator equipment by electrically grounding the flat surfaces in contact with the enclosure or by use of the thin aluminum sheet 27 which may be electrically grounded and which serves the double purpose of being a shield and a heat transfer surface.

An additional feature of the instant invention is that the openings necessary for the passage of ambient air through the unit are provided on the edges and top so as to permit a greater saving of space in the use of the instant invention.

It is further to be understood that the temperature control units of the instant invention may be provided with sensing means for sensing the actual temperature within an enclosure to which the unit is mounted to control the amount of refrigeration or other type of cooling so as to maintain a desired preset temperature.

The compressor of FIGS. 3 and 4 is designed to be in constant operation so as to totally eliminate high currents starting transients, reduced compressor motor temperature rise and extend the system life. The temperature control system (not shown) is preferably of a nonelectrical type. The motors employed in the embodiments of FIGS. 2*a* and 3—5 are permanent split capacitor motors which eliminate all motor and compressor relays. The lower motors are fitted with precision ball bearings to ensure a long useful operation life and all rotating components such as the motors, blowers and compressors may be shock-mounted for minimum vibration. All the air filters are arranged to be easily removable and may be cleaned to keep all parts such as the condenser coil, for example, clean throughout their operation. In any of the units shown in the figures, the air leaving the exterior chamber (for example, the chamber 32 of FIG. 2*b*) may pass to an ultimate heat sink which could be water and need not necessarily be ambient air. In other words, the heat ejected from the cabinet can go out to the atmosphere or alternatively, to some externally cooled liquid.

As can be seen, the instant invention provides a new and novel temperature control unit especially suitable for cooling electronic equipment enclosures and occupying a minimum of space while permitting maximum accessibility to the electronic equipment.

While the instant invention has been described with respect to several preferred embodiments thereof, it is to be understood that many modifications and variations thereof will now be apparent to those skilled in the art and many additional uses will now be apparent such as use of the temperature control unit to control the temperature of a home by installing the unit into the outer wall of the same general construction as the instant invention. It is, therefore, preferred that the scope of the invention not be limited by the specific disclosure herein, but only by the appended claims.

We claim:

1. A temperature control unit for regulating the temperature within an enclosure or rack containing electronic equipment and the like, said unit being self-contained and being especially suitable for external mounting to said enclosure, said unit comprising:

a housing having at least one substantially hollow chamber therein communicating with the enclosure;

said housing having a first substantially flat surface sealing said housing and including a first pair of vertically spaced openings therein communicating with said hollow chamber;

mounting means connected to said housing for mounting said unit on the exterior of said enclosure with sad pair of openings communicating with the interior of said enclosure; and electrically operable air circulation means within said housing isolated from the interior of said enclosure by said flat sealing surface and communicating with said hollow chamber in said housing for producing a forced flow in said enclosure by forcing air from said chamber through one of said pair of openings into and through said enclosure and then through the other of said openings back into said chamber to control the temperature of the air in said enclosure, said flat surface also providing electrical shielding of the electronic equipment within said enclosure from interference resulting from the electronic operation of said air circulation means employed in regulating said enclosure temperature.

2. The temperature control of claim 1 wherein said mounting means includes hinge means whereby said unit may be pivoted about said hinge means to move into and out of engagement with said enclosure.

3. The temperature control unit of claim 1 wherein said housing includes a second pair of openings communicating with a heat sink external to said enclosure for assisting in heat transfer from said enclosure for assisting in heat transfer from said enclosure to said ambient air.

4. The temperature control unit of claim 3 wherein said housing includes partition means dividing said housing into at least two chambers to prevent air flow therebetween; said first pair of openings communicating with a first of said chambers and with said enclosure and said second pair of openings communicating with a second of said chambers and with said external heat sink; said partition means serving as a heat transfer surface between said first and second chambers.

5. The temperature control unit of claim 4 wherein said air circulation means producing forced convection in said enclosure is in said first chamber and circulates the air in said enclosure through said enclosure, said first pair of openings and by said partition means in said first chamber; second air circulation means in said second chamber for circulating ambient air from a first opening of said second pair of openings by said partition means in said second chamber and out the second opening of said second pair of openings and thereby assisting said heat transfer from said first chamber to said second chamber and to said external heat sink.

6. The temperature control unit of claim 4 wherein said partition means is metallic and serves the dual function of providing a heat transfer surface and preventing air flow between the cabinet interior and exterior.

7. The temperature control unit of claim 6 further including refrigeration means comprising a condenser located in said second chamber and an evaporator in said first chamber; blower means in said first chamber for forcing the air in said enclosure through said evaporator thereby cooling said enclosure.

8. The temperature control unit of claim 6 further including a third chamber substantially identical to said first chamber; second partition means between said third chamber and said second chamber; said housing having a second substantially flat surface including a third pair of openings spaced therein communicating with said third chamber; said unit being positioned so that said third pair of openings communicate with the interior of a second enclosure so that said second enclosure is cooled in the same manner as said first enclosure.

9. The temperature control unit of claim 8 wherein said second chamber is situated between said first and third chambers and said substantially flat surfaces are two external surfaces of said unit directly opposite each other whereby said unit may be placed between said first and second enclosures to constitute a wall between said enclosures.

10. A temperature control unit for regulating the temperature within an enclosure or rack containing electronic equipment and the like, said unit being self-contained and being especially suitable for external mounting to said enclosure or rack and comprising:

an external housing having first and second chambers therein;

a metallic partition in said housing dividing said housing into said first and second chambers and providing a heat transfer surface between said first and second chambers and providing an electrical shield between said first and second chambers;

said housing further having a substantially flat external surface sealing said housing and forming one wall of said first chamber, said surface having a pair of openings therein communicating with said first chamber;

said housing further having a pair of openings in its external walls communicating with said second chamber and with external ambient air;

said unit including mounting means for mounting said unit to said enclosure or rock with said pair of openings in said substantially flat surface communicating with the interior of said enclosure or rack;

electrically operable first air circulating means in said first chamber isolated from the interior of said enclosure by said flat sealing surface for circulating the air of said enclosure or rack through one of said openings in said substantially flat surface by said metallic partition in said first chamber and back into said enclosure or rack through said other opening in said substantially flat surface whereby the heat from said air is transferred to said second chamber through said metallic partition, with said flat surface also providing electrical shielding of the electronic equipment within said enclosure from interference resulting from the electronic operation of said air circulation means employed in regulating said enclosure temperature; and second air circulating means in said second chamber for circulating said ambient air through one of said openings communicating with said second chamber by said metallic partition in said second chamber and out said other opening communicating with said second chamber thereby assisting said heat transfer by removing the heat from said metallic partition.

11. A temperature control unit for regulating the temperature within an enclosure, said unit being self-contained and being especially suitable for external mounting to said enclosure, said unit comprising:

an external housing having at least one substantially hollow chamber therein communicating with the enclosure and isolated from the region surrounding the enclosure;

said housing including partition means dividing said housing into at least two chambers to prevent air flow therebetween, said housing including a first pair of openings communicating with a first of said chambers and with said enclosure and a second pair of openings communicating with a heat sink within said housing, said partition means serving as a heat transfer surface between said first and second chambers;

with said first pair of openings being vertically spaced along a flat surface of said housing in orientation to accept incident air forced through one of said first pair of openings in a first direction by apparatus described below and discharged through the other of said openings in temperature regulated condition in a substantially parallel direction;

with said second pair of openings also being vertically spaced but oriented such that air forced through one of said second pair of openings is accepted in a direction substantially perpendicular to the direction or acceptance and discharge of air through said first pair of openings and such that discharge of temperature regulated air through the other of said second pair of openings is effected in a direction substantially perpendicular to the entry of air through said one of said second pair of openings and to the direction of acceptance and discharge of air through said first pair of openings;

mounting means connected to said housing for mounting said unit on the exterior of said enclosure with said pair of openings communicating with the interior of said enclosure;

first air circulation means in said first chamber for circulating ambient air from said first opening of said first pair of openings through said other opening of said first pair by producing a forced flow in said chamber by forcing air from said chamber through said one of said first pair of openings into and through said enclosure and then through said other of said first openings back into said first chamber;

second air circulation means in said second chamber for circulating ambient air from said one opening of said second pair of openings through said other one of said pair of openings to producing a forced flow in said enclosure by forcing air from said second chamber through said one of said second pair of openings into and through said enclosure and then through said other of said second openings back into said second chamber; and whereby the temperature of the air in said enclosure is controlled, being assisted by heat transfer from said first chamber to said second chamber and to said external heat sink.